US012640329B2

(12) United States Patent
Bachmann et al.

(10) Patent No.: US 12,640,329 B2
(45) Date of Patent: May 26, 2026

(54) X-RAY APPARATUS, ELECTRON EMISSION DEVICE AND MANUFACTURING METHOD

(71) Applicant: KETEK GmbH Halbleiter-und Reinraumtechnik, Munich (DE)

(72) Inventors: Michael Bachmann, Munich (DE); Simon Edler, Munich (DE); Andreas Schels, Wolnzach (DE); Florian Herdl, Oberaudorf (DE); Natalie Galfe, Munich (DE); Georg Düsberg, Taufkirchen (DE)

(73) Assignee: KETEK GmbH Halbleiter- und Reinraumtechnik, Munich (DE)

( * ) Notice: Subject to any disclaimer, the term of this patent is extended or adjusted under 35 U.S.C. 154(b) by 146 days.

(21) Appl. No.: 18/484,797

(22) Filed: Oct. 11, 2023

(65) Prior Publication Data

US 2025/0125113 A1 Apr. 17, 2025

(51) Int. Cl.
*H01J 35/18* (2006.01)
*H01J 9/24* (2006.01)
*H01J 35/04* (2006.01)
*H01J 35/06* (2006.01)

(52) U.S. Cl.
CPC ................ *H01J 35/18* (2013.01); *H01J 9/24* (2013.01); *H01J 35/04* (2013.01); *H01J 35/064* (2019.05); *H01J 35/065* (2013.01)

(58) Field of Classification Search
CPC .......... H01J 35/18; H01J 35/064; H01J 35/04; H01J 35/065; H01J 9/24
See application file for complete search history.

(56) References Cited

U.S. PATENT DOCUMENTS

| | | | | |
|---|---|---|---|---|
| 10,283,311 | B2 * | 5/2019 | Jeong | H01J 35/065 |
| 2007/0108887 | A1 * | 5/2007 | Deguchi | H01J 1/312 445/24 |
| 2007/0252508 | A1 * | 11/2007 | Kim | H01J 29/481 313/310 |
| 2014/0044240 | A1 | 2/2014 | Pahlke et al. | |
| 2017/0287673 | A1 * | 10/2017 | Peterson | H01J 35/186 |
| 2023/0369001 | A1 | 11/2023 | Bachmann et al. | |
| 2023/0415096 | A1 | 12/2023 | Bachmann | |

(Continued)

FOREIGN PATENT DOCUMENTS

| | | | |
|---|---|---|---|
| DE | 102014103546 | A1 | 8/2015 |
| DE | 102022111959 | A1 | 11/2023 |
| DE | 102023112454 | A1 | 11/2023 |

OTHER PUBLICATIONS

Melinon, P., "Vitreous Carbon, Geometry and Topology: A Holistic Approach", Nanomaterials, vol. 11, https://doi.org/10.3390/nano11071694, Jun. 28, 2021, 89 pages.

(Continued)

*Primary Examiner* — Anne M Hines
(74) *Attorney, Agent, or Firm* — Slater Matsil, LLP

(57) ABSTRACT

In an embodiment an X-ray apparatus includes at least one of an X-ray source configured for generating X-rays or an X-ray detector configured for detecting X-rays, a housing in which the at least one of the X-ray source or the X-ray detector is located, the housing having an opening and a window covering the opening, wherein the window is configured to be passed by the X-rays, wherein the window comprises a transmission layer, and wherein the transmission layer is a carbon layer of glassy carbon.

9 Claims, 6 Drawing Sheets

(56) References Cited

U.S. PATENT DOCUMENTS

| | | | |
|---|---|---|---|
| 2024/0071708 | A1 | 2/2024 | Dusberg et al. |
| 2024/0071709 | A1 | 2/2024 | Dusberg et al. |

OTHER PUBLICATIONS

Murakami, K. et al., "Graphene-oxide-semiconductor planar-type electron emission device", Applied Physics Letters, https://doi.org/10.1063/1.4942885, Feb. 26, 2016, 2 pages.
Schreiber, M. et al.; "Transparent ultrathin conducting carbon films", Applied Surface Science, vol. 256, Issue 21, https://doi.org/10.1016/j.apsusc.2010.03.138, Aug. 2010, 6 pages.
Uskokovic, V., "A historical review of glassy carbon: Synthesis, structure, properties and applications", Carbon Trends, vol. 5, https://doi.org/10.1016/j.cartre.2021.100116, Aug. 28, 2021, 37 pages.

* cited by examiner

X-RAY APPARATUS, ELECTRON EMISSION DEVICE AND MANUFACTURING METHOD

TECHNICAL FIELD

An X-ray apparatus and an electron emission device are provided. A method for manufacturing such an apparatus and device, respectively, is also provided.

BACKGROUND

Documents DE 10 2014 103 546 A1 and US 2014/0044240 A1 refer to X-ray apparatuses.

Document M. Schreiber et al., "Transparent ultrathin conducting carbon films" in Applied Surface Science, Vol. 256 (21), pages 6186 to 6190, published in 2010, https://doi.org/10.1016/j.apsusc.2010.03.138, refers to ultrathin conductive carbon layers produced using pyrolysis.

Document K. Murakami, K., "Graphene-oxide-semiconductor planar-type electron emission device" in Applied Physics Letters, Vol. 108(8), published in 2016, https://doi.org/10.1063/1.4942885, refers to an electron source.

Document V. Uskoković, "A historical review of glassy carbon: Synthesis, structure, properties and applications" in Carbon Trends, Vol. 5, 100116, published in 2021, https://doi.org/10.1016/j.cartre.2021.100116, and document P. Mélinon, "Vitreous Carbon, Geometry and Topology: A Hollistic Approach" in Nanomaterials, Vol. 11, page 1694, published in 2021, https://doi.org/10.3390/nano11071694, discusses glassy carbon.

SUMMARY

Embodiments provide an X-ray apparatus and an electron emission device that can be manufactured efficiently.

In at least one embodiment, the manufacturing method comprises:

- applying an organic raw material onto a substrate, the raw material is applied as a liquid;
- solidifying the raw material so that a raw material layer is formed; and
- pyrolizing the raw material layer at a temperature of at least 400° C. and of at most 2000° C. so that a carbon layer of glassy carbon is formed,
- wherein the carbon layer is a transmission layer in a window of an X-ray apparatus or is a gate layer in an electron emission device.

Glassy carbon, GC for short, may also be referred to as glass-like carbon, GLC. Further synonyms are vitreous carbon and polymeric carbon.

For example, at room temperature, that is, at 300 K, a viscosity of the liquid the raw material is applied is at most 100 Pa·s or is at most 1 kPa·s. Alternatively or additionally, said viscosity is at least 0.001 Pa·s at room temperature.

In at least one embodiment, the X-ray apparatus comprises

- at least one of an X-ray source configured for generating X-rays or an X-ray detector configured for detecting X-rays;
  - a housing in which the at least one of the X-ray source or the X-ray detector is located, the housing comprises an opening; and
  - a window covering the opening, the window is configured to be passed by the X-rays, wherein the window comprises a transmission layer,
  - wherein the transmission layer is a carbon layer of glassy carbon.

For example, the X-ray source comprises an electron source and an accelerating electric field as well as a target for electrons provided by the electron source. It is possible that the electron source is configured to emit electrons by means of thermionic emission, field emission, tribo emission, photo emission, plasma emission and/or hot electron emission. For example, the electron source is a heated wire. For example, the target is the transmission layer itself or alternatively or additionally a metal film comprising one or more metals. At the target the emitted electrons impinge due to the acceleration electrodes and therefore generate the X-rays.

For example, the X-ray detector is or comprises a semiconductor drift detector, like a silicon drift detector, SDD for short. Otherwise, the X-ray detector is or comprises a photo diode, a scintillator set-up, a photo multiplier, a calorimeter, or a bolometer, or the like. There can be a plurality of X-ray detectors, also of different types.

For example, the housing is to provide a low-pressure or evacuated space in which the at least one of the X-ray source or the X-ray detector is located. It is possible that the housing is of multi-part fashion and may comprise, for example, a base plate and a tube. The base plate may be configured as a circuit board or as a mounting platform comprising, for example, electrical feedthroughs. The tube may be a metal, ceramic or glass part of a material, that can be mostly opaque concerning the X-rays to be emitted or to be detected. For example, the tube is electrically insulating the acceleration voltage.

For example, the window is configured to let the X-rays into or out of the housing, respectively, and to close the opening to allow, for example, for a pressure difference of 1 bar between an interior and an exterior of the housing. The transmission layer may be one of a plurality of components of the window and may be one layer in a layer stack the X-rays run through, or the window consists of the transmission layer, at least in a region to be passed by the X-rays. Additionally, the window may comprise a target material for generating the X-rays; said layer could be the transmission layer or another layer of the window.

In at least one embodiment, the electron emission device comprises

- an electrically conductive base layer;
- an intermediate layer directly on the base layer, the intermediate layer is of a material having a band gap leading to a higher energy of a conduction band edge of the intermediate layer compared to the base layer, and a breakdown voltage of the intermediate layer exceeds a work function of the gate layer divided by the elementary charge, that is, by e; and
- an electrically conductive gate layer directly on a side of the intermediate layer remote from the base layer,
- wherein the electron emission device is configured to emit electrons through the gate layer upon applying a voltage between the base layer and the gate layer,
- wherein the gate layer is a carbon layer of glassy carbon.

For example, a thickness of the intermediate layer defines a maximum voltage to be applied across the intermediate layer between the base layer and the gate electrode. The breakdown voltage may be a breakdown field strength of a material of the intermediate layer times its thickness. A maximum energy gain for electrons in the intermediate layer may exceed the work function of the gate layer or the work function of the gate layer minus 0.2 eV, for example.

By selecting the thickness of the intermediate layer and by adjusting the voltage between the base layer and the gate layer, an energy of the emitted electrons can be tuned.

That the band gap of the intermediate layer leads to a higher energy of the conduction band edge of the intermediate layer compared to the base layer, and that the breakdown voltage of the intermediate layer exceeds a work function of the gate layer divided by the elementary charge, means, for example, that the band gap of the intermediate layer is at least 3 eV or is at least 4 eV.

For example, the base layer is an electrically conductive carrier that could at the same time be the mechanically supporting component and sustaining the electron emission device. It is possible for the carrier to be mechanically rigid so that the electron emission device does not deform during the intended use. Alternatively, the base layer can be mechanically flexible and designed as a film so that the electron emission device can be bent.

For example, the intermediate layer is of one or of a plurality of materials having a band gap that is optionally larger than the band gap of the base layer. Thereby, the difference between the work function and electron affinity of the carrier material needs to be lower than the difference of both values of the intermediate layer.

The band gap of the material of the intermediate layer may be at least 1 eV or at least 2 eV or at least 3 eV or at least 4 eV or at least 5 eV or at least 6 eV. The intermediate layer may be an insulating layer of a dielectric material. The intermediate layer is preferably disposed directly on the electrically conductive base layer. For example, the intermediate layer is of or comprises at least one of silicon oxide, hexagonal boron nitride, silicon nitride, hafnium oxide, diamond.

For example, a material of the gate layer differs from the material of the electrically conductive base layer, or it may also be the same material. In particular, the gate layer is attached directly to a side of the intermediate layer facing away from the electrically conductive base layer.

For example, the gate layer is configured as a gate electrode. Especially, the gate layer could be thin. For example, a thickness of the gate layer is then at least one atomic layer or at least 1 nm. Alternatively or additionally, this thickness is at most 15 nm or at most 10 nm or at most 5 nm or at most 2 nm.

The gate layer may be a continuous, uninterrupted and hole-free layer and may optionally be of constant thickness. Otherwise, it is possible that the gate layer comprises a plurality of pores or holes which may be distributed regularly or also randomly.

In order to achieve the lowest possible scattering in the gate layer and at the interface to the intermediate layer, the gate layer should be made as thin as possible on the one hand. For example, a thickness of the gate layer is in the range of the wavelength of the electrons, that is, at most 20 nm. In addition, the gate layer should have a small energy difference of the conduction band edge to the conduction band edge of the intermediate layer in order to minimize quantum mechanical reflection.

Due to the requirement of the small layer thickness, the conductivity of a material of the gate layer is also preferably selected to be as high as possible in order to realize a low voltage drop across the gate layer and thus the possibility of the largest possible active areas.

One possibility is carbon-based gate layers. Here, on the one hand, a diamond-like, that is, sp3 hybridized dominated, as well as a graphite-like, that is, sp2 hybridized dominated, design of the gate electrode 23 can be considered. Carbon materials in both forms exhibit very high, possibly direction-dependent electrical conductivities, as well as very high electron transmission. This is particularly true for graphene. However, these materials may be relatively complicated to be produced in the required size and quality. The latter aspect can be overcome with the glassy carbon layer serving as the gate layer or serving for the transmission layer, for example.

Thus, in gate-insulator-substrate, GIS, devices which enable the emission of hot electrons from a planar thin film stack and comprising the base layer, the intermediate layer and the gate layer, the gate layer serving as the electrode, should be as thin as possible, with high conductivity of the gate at the same time, in order to ensure homogeneous emission across an emission surface. For this purpose, a pyrolytic carbon layer may be used as the gate layer, which is grown directly on the insulating intermediate layer by a chemical vapor deposition, CVD, process, for example. Alternatively, as stated above, graphene could be used, which is grown catalytically on, for example, a copper, nickel, cobalt, platinum or palladium carrier and then transferred to the target structure in a wet chemical transfer step, for example. Both of these processes are in principle production-ready and available at wafer scale.

Contrary to a CVD grown graphene, glassy carbon, GC, is fabricated in a very different way. If a polymer is used, the crystal structure can resemble a needle-shaped microstructure of the resulting carbon layer. Depending on the used starting material and processing procedure the crystallinity can be tuned from amorphous via partially amorphous to completely crystalline. GC can be produced by spinning a carbon-containing substance, such as polymer varnish, which can be diluted in various solvents. The varnish is then pyrolized at high temperatures, for example, above 500° C., to form the GC. In this way, a material like a polymer on the target carrier, like the base layer, is converted to GC and thus made electrically conductive. Furthermore, if a photosensitive starting material is used, the layer can be structured by lithography prior to the pyrolization step.

The conductivity of the GC layer can be adjusted by the temperature of the pyrolysis. The comparatively simple manufacturing process of the GC layer also makes it possible to structure the gate layer, for example, before pyrolysis using standard industrial lithography systems and thus effectively save a structuring step. The prerequisite for this is that the applied lacquer is photosensitive, like a photoresist.

The electrical performance of the glassy carbon layer may be inferior to other manufacturing processes due to the low graphitisation. This could also have a negative impact on the emission efficiency. However, it is possible to pyrolize at much lower temperatures than performing CVD processes, which makes the process gentler on the intermediate layer and results in little to no diffusion of carbon atoms into the intermediate layer. Also, due to the already connected polymer chains, fewer carbon atoms may diffuse at the same temperature compared to a layer produced by CVD.

Thus, using CVD can result in a rough interface between the carbon layer and the intermediate layer. This is caused by the diffused carbon atoms and creates scattering centers where the electrons can lose energy and thus partly do not have enough energy to overcome the work function. These scattering centers could be prevented when using the glassy carbon manufacturing process. In this way, the possible disadvantage of poorer electrical performance can be compensated for by the gentler process and the emission efficiency can even be surpassed compared to other manufacturing methods. Likewise, the service life of the electron emission device can be extended due to less diffusion of carbon atoms. Furthermore, this glassy carbon layer has a higher chemical stability. For example, glassy carbon is used in industry for chemical processes as a material for crucibles. These properties make glassy carbon suitable for the applications described herein as a material for a gate electrode in the GIS emitter, that is, in the electron emission device described herein.

Furthermore, GC in a thicker version of 20 nm to 1 μm, for example, may be suitable for electric contact structures of the GIS emitter in order to reduce the contact resistance at the gate layer and to realize the emitter in a chemically more stable form. The GC layer could also be used as a carrier, that is, as the base layer. In this case, the layer stack GC-intermediate layer-GC can also be detached from a spun-on chip and used as a flexible emitter chip. Another possibility would be to produce the intermediate layer using a similar process. For example, hexagonal boron nitride, which is available in solvents, could be spin-coated in the solvent and then annealed in a subsequent high-temperature step to remove the solvents. In addition, such a process could be carried out with (poly)borazine to fabricate a boron nitride layer, like hexagonal boron nitride, for example. In this way, a full spin-on electron emission device could be realized which is pyrolised in at least one annealing step.

Moreover, glassy carbon could also be used as a membrane for the transmission of particles and radiation. In this context, window materials for detectors, side windows or transmission X-ray tubes as well as transmission windows in electron or ion sources are conceivable. Hence, the GC layer can be used as a transmission layer in the X-ray apparatus or in a particle source, for example, for electrons or also for other particles like protons or neutrons.

In this context, an object may be to achieve the highest reasonably possible quality of the transmission layer in order to achieve the highest reasonably possible mechanical stability. It is assumed that a high degree of graphitization, that is, large grains with a graphene structure, would lead to high mechanical strength. Pyrolitic carbon can also be used for this purpose. Accordingly, using a GC layer for a window, high mechanical strength of the glassy carbon layers can be achieved so to use them efficiently as thin membranes in transmission windows. Here, another aspect comes into play: Pyrocarbon shows grains without texture due to the CVD process. Glassy carbon, however, also shows a texture and needle-like grains or filaments due to the production from photoresists with very long-chain molecules. This fibrous texture could allow for comparatively greater strength, for example, in the membrane direction.

The glassy carbon layer may also be referred to as Pyrolytic Photoresist Film (PPF), Vitreous Carbon and Amorphous Carbon, and belongs to the family of pyrolytic carbon. The specific conductivity of GC can be varied depending on the pyrolysis temperature, the precursor used and the duration of the pyrolysis. For example, specific electric conductivities of the GC layer between 10 S/m and $10^7$ S/m may be achieved. For an x-ray tube or detector the transmittance of electrons through the GC layer can be at most 1% and for x-rays at least 1%. For an electron emissive device the transmittance of electrons is at least 10%, for example. The degree of graphitisation after pyrolysis is an aspect to be considered in this respect. The chemical resistance can also be adjusted via the starting material used and the pyrolysis temperature.

Thus, a pre-patternable electron-transmissive layer of glassy carbon can be used in gate-insulator-substrate electron emitter as gate electrode, and as electron and radiation-transmissive membrane in X-ray apparatuses or particle sources. Furthermore, a glassy carbon structure could be used as a supporting grid to enable a mechanically stable structure for very thin transmission layers.

In case of a GIS structure, with the GC layer an increased emission efficiency for electrons due to lower diffusion of the carbon atoms can be achieved. An extended lifetime due to the lower diffusion of the carbon atoms is also possible. With the GC layer, a pre-patternable, lightweight and wafer scalable process for a gate electrode can be implemented and higher chemical stability can be achieved. Applied thicker, GC can also be used as an electric contact material for lower contact resistance and simplified manufacturing process. GC produced in an increased thickness can also be used as a carrier material, so that a structure of glassy carbon—intermediate layer—glassy carbon, GCIGC for short, ca be implemented in the GIS device. With the GCIGC concept, after wafer detachment a mechanically flexible electron emission device can be realized. In combination with the spin-coated gate layer, insulating intermediate layers are also possible to be produced by spin-coating, for example, in case of ((poly)-borazine); thus, a GIS structure mostly or fully produced by cost-efficient spin-coating processes can be created.

According to at least one embodiment, for example, when used as a transmission layer, a thickness of the carbon layer is at least one monolayer or is at least 5 nm or is at least 50 nm. Alternatively or additionally, said thickness is at most 50 μm or is at most 2 μm or is at most 200 nm or is at most 20 nm.

According to at least one embodiment, the transmission layer is self-supporting. Thus, the window layer may consist of the carbon layer at least in a central portion of the transmission layer. The central portion is that part of the transmission layer configured to be passed by the X-rays. For example, the central portion is a circular or elliptical area, seen in top view.

According to at least one embodiment, the window layer comprises a supporting structure. The supporting structure can be, for example, a grid structure and/or a bar structure applied to the carbon layer. Thus, locally the thickness of the carbon layer can be increased. The supporting structure may also be of GC or may be of a different material, like silicon.

According to at least one embodiment, a ratio of a mean diameter of the carbon layer and a thickness of the carbon layer is at least 10 or is at least $10^2$ or is at least $10^4$ or is at least $10^5$ or is at least $10^6$. Alternatively or additionally, said ratio is at most $10^7$ or is at most $10^6$ or is at most $10^4$. Hence, the carbon layer can be comparably thin, relative to its lateral extent. The mean diameter D is, for example, calculated from an area content A of the carbon layer as follows: $D=(4\ A/\pi)^{0.5}$.

For example, when used in an X-ray detector as a window having a supporting structure the thickness of the carbon layer is between 50 nm and 200 nm and the thickness may be between 0.5 μm and 2 μm without a supporting structure. When used in an X-ray source as a window, the thickness is, for example, between 0.5 μm and 50 μm, possibly depending on an operating voltage of the X-ray source.

According to at least one embodiment, the glassy carbon is an amorphous material. Thus, there may be no long-range order in the GC layer.

It is possible that a carbon content in the GC layer is at least 90% by mass or at least 95% by mass or at least 99% by mass.

According to at least one embodiment, seen in top view and by transmission electron microscopy, the carbon layer comprises a plurality of filaments. For example, at least some or all of the filaments have a length-to-width ratio of at least 5 or of at least 10 or of at least 20 or of at least 50. The filaments may be slung into one another so that the GC layer may appear as a flat ball of wool. These filaments may also be referred to as elongated grains. It is possible that these filaments may comprise small sheets of graphene.

Concerning the structure of the GC, reference is further made to V. Uskoković as cited above, see FIG. 7 therein and the associated description, as well as to P. Mélinon as cited above, see FIGS. 2 to 5 therein and the associated description, the respective disclosure content is hereby incorporated by reference.

According to at least one embodiment, when the carbon layer is used as the gate layer, a thickness of the carbon layer is at least one monolayer or is at least two monolayers or is at least 1 nm or is at least 2 nm. Alternatively or additionally, this thickness is at most 20 nm or is at most 10 nm or is at most 6 nm.

According to at least one embodiment, the base layer comprises or consists of glassy carbon as well. Hence, the electron emission device can be mechanically flexible. A thickness of the base layer is in this case, for example, at least 0.1 μm or at least 1 μm and/or is at most 0.01 mm or is at most 0.1 mm or is at most 1 mm.

According to at least one embodiment, the intermediate layer is an oxide or a nitride, for example, an oxide or a nitride of a semiconductor or of a metal. That is, the intermediate layer may be of a silicon oxide of a boron nitride, like hexagonal boron nitride, for example.

According to at least one embodiment, the electron emission device further comprises a first electric contact structure. For example, the first electric contact structure comprises or is a frame around the gate layer, seen in top view or seen in bottom view of the gate layer. Alternatively or additionally, the first electric contact structure comprises or consists of at least one of a grid structure or a bar structure extending across the gate layer and directly located at the gate layer, for example, on a side remote from the intermediate layer.

According to at least one embodiment, a thickness of the first electric contact structure exceeds a thickness of the carbon layer by at least a factor of 2 or by at least a factor of $10^1$ or by at least a factor of $10^2$ or by at least a factor of $10^3$ or. Alternatively or additionally, said difference is at most factor of $10^6$ or at most factor of $10^5$ or at most factor of $10^4$. This applies especially if the first electric contact structure is of glassy carbon as well. Accordingly, the carbon layer can be electrically contacted by means of the first electric contact structure made of GC, and optionally the first electric contact structure comprises a current spreading structure extending across the gate layer.

The first electrical connection structure may also be, for example, a metallic structure.

According to at least one embodiment, the gate layer has a specific electric conductivity of at least 10 S/m or of at least $10^3$ S/m or of at least $10^4$ S/m or of at least $10^5$ S/m. Alternatively or additionally, said value is at most $10^7$ S/m.

According to at least one embodiment, the electron emission device is configured for a bending radius of 1 cm or less. Hence, the electron emission device can be mechanically flexible.

According to at least one embodiment, the electron emission device serves as the electron source in the X-ray source. Hence, the electron emission device can be part of the X-ray apparatus. However, the electron emission device can also be a device different from and not included in the X-ray apparatus.

A method for manufacturing at least one of the electron emission device or the X-ray apparatus is additionally provided. By means of the method, at least one of the electron emission device or the X-ray apparatus as indicated in connection with at least one of the above-stated embodiments is produced. Features of the electron emission device and the X-ray apparatus are therefore also disclosed for the method and vice versa.

In at least one embodiment, by means of the method a carbon layer is manufactured, and the method comprises the following steps, for example, in the order stated:

applying an organic raw material onto a substrate, the raw material is applied as a liquid; solidifying the raw material so that a raw material layer is formed; and pyrolizing the raw material layer at a temperature of at least 400° C. and of at most 2000° C. so that a carbon layer of glassy carbon is formed, wherein the carbon layer is a transmission layer in a window covering an opening in a housing of an X-ray apparatus that comprises at least one of an X-ray source configured for generating X-rays or an X-ray detector configured for detecting X-rays, or the carbon layer is a gate layer directly located on an intermediate layer of a material having a band gap leading to a higher energy of a conduction band edge of the intermediate layer compared to the base layer, and a breakdown voltage of the intermediate layer that exceeds a work function of the gate layer divided by the elementary charge, that is, by e, and directly located on an electrically conductive base layer in an electron emission device configured to emit electrons through the gate layer upon applying a voltage between the base layer and the gate layer.

According to at least one embodiment, the substrate is the intermediate layer. For example, in this case the raw material layer is to produces the gate layer directly on the intermediate layer. The intermediate layer can be located on the base layer when being applied with the raw material layer so that the base layer together with the intermediate layer may be regarded as the substrate as well, for example.

Otherwise, the substrate can be a temporary auxiliary carrier at which the carbon layer is produced and from which the carbon layer is then removed and placed, for example, onto the intermediate layer or mounted on the housing of the X-ray apparatus. Thus, the auxiliary carrier may not be present in the finished X-ray apparatus or in the finished electron emission device, and the method may further comprise the step of removing the substrate from the carbon layer.

As a further option, the substrate may be a starting component for a frame or a supporting structure carrying the carbon layer. In this case it is possible that a disc or wafer of, for example, silicon is used as the substrate and is provided with the raw material. After forming the carbon layer, the disc or wafer is etched so that the frame or the supporting structure results from the disc or wafer and so that the window or part of the window may result. It is also possible that the disc or wafer is completely etched away after forming the carbon layer.

According to at least one embodiment, the method further comprises:

structuring the raw material layer so that a shape of the carbon layer is determined prior to pyrolizing the raw material layer.

Hence, after pyrolysis, no material needs to be removed from the carbon layer. For example, in this case the raw-material may be a photo-resist or a photo-sensitive lacquer, either a positive or a negative photo-resist. If for example, the gate layer and the first electric contact structure are both of GC, then each one of these components can be produced by means of applying a photo-resist, structuring the photo-resist and then performing pyrolysis. Also different photo-resists or different dilutions of the same photoresist can be used with different thicknesses.

According to at least one embodiment, a protection layer is applied on the carbon layer. For example, the protection layer is applied directly on the carbon layer, possibly on a side facing away from the intermediate layer or on a side facing away from the target.

According to at least one embodiment, the window comprises one or a plurality of adhesion layers. For example, the adhesion layer is located directly between the target and the carbon layer. The adhesion layer can, for instance, be of a carbide, like a carbide of a metal contained in the target which is, for example, Ti, TiN and/or Si. An adhesive layer may alternatively or additionally be provided between the frame or supporting structure and the target or carbon layer, for example.

An X-ray apparatus, an electron emission device and a manufacturing method described herein are explained in greater detail below by way of exemplary embodiments with reference to the drawings. Elements which are the same in the individual figures are indicated with the same reference numerals. The relationships between the elements are not shown to scale, however, but rather individual elements may be shown exaggeratedly large to assist in understanding.

DETAILED DESCRIPTION OF ILLUSTRATIVE EMBODIMENTS

Figure 1:
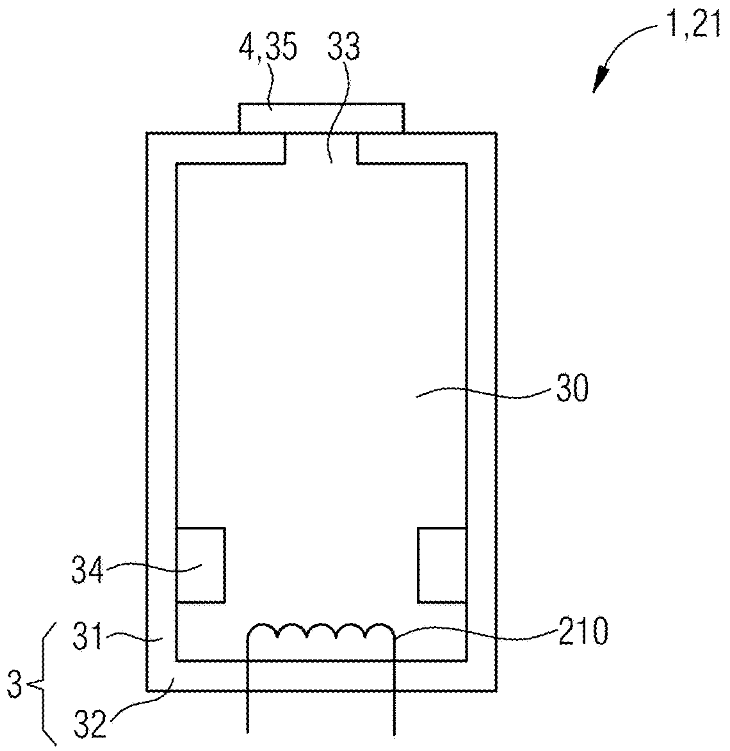
FIGS. 1 and 2 are schematic sectional views of exemplary embodiments of X-ray apparatuses described herein.
Figure 2:
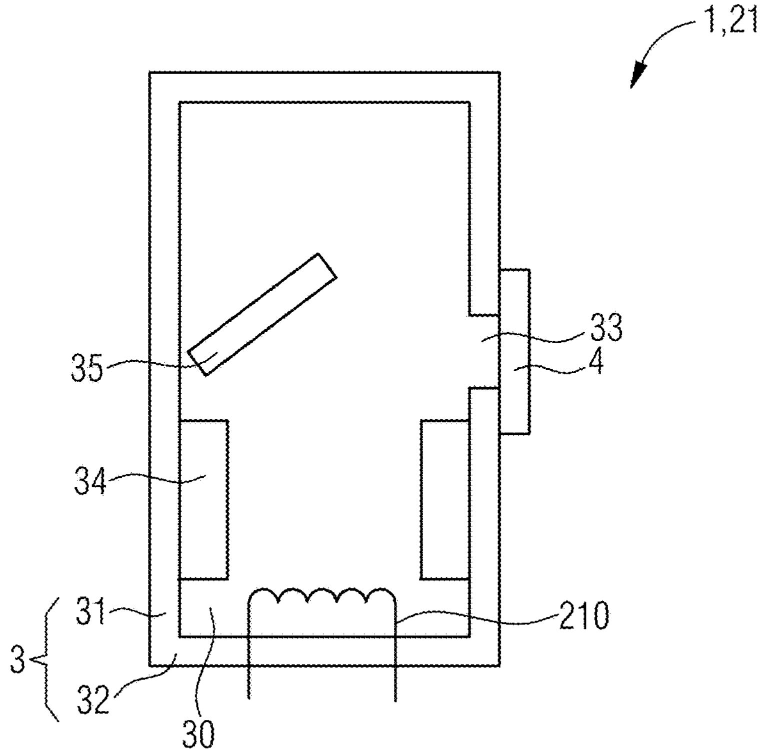

FIGS. 1 and 2 illustrate exemplary embodiments X-ray apparatuses 1 configured as an X-ray source 21. The X-ray source comprises a housing 3 in which an electron source 210 is placed. For example, the electron source 210 is a heated wire. However, the electron source 210 may also be an electron emission device 10 as described, for example, in connection with FIGS. 12 to 16.

The electron source 210 may be mounted on a base plate 32 of the housing 3 and may be surrounded by a tube 31 of the housing 3. At a side of the tube 31 remote from the electron source 210, there is an opening 33.

The opening 33 is closed by a window 4. Between the electron source 210 and the window 4 or the tube 31 next to the window 4, by means of electrodes, not shown, a suitable electric field is applied to accelerate electrons from the electron source 210 towards a target 35. For example, the target 35 is a layer of a target material, like a metal. When the accelerated electrons hit the target 35, subsequently X-rays are produced. As an option, electron optics 34 can be provided in the housing 3.

The window 4 seals an interior of the housing 3. The interior is, for example, an evacuated space 30. Thus, the window 4 needs to be sufficiently mechanically stable to bear a pressure difference of around 1 bar between the interior and an exterior of the housing, and has to be translucent for the produced X-rays. Optionally, the window 4 needs to carry the target 35 as well.

According to FIG. 1, the target 35 is located on a side of the window 4 facing the electron source 210. The electrons are straightly accelerated on the target 35 and, thus, on the window 4. Contrary to that, in FIG. 2 the window 4 is a side window on a lateral side of the tube 31, and the target 35 is a separate component. Hence, in FIG. 2 the window 4 is not or not significantly hit by the electrons.

The window 4 comprises glassy carbon, GC. Especially, that part of the window 4 that mechanically carries the window is of GC. In other words, without the GC the window 4 would not be mechanically stable in the intended use of the X-ray apparatus 21.

Although the apparatus 1 is referred to as an X-ray apparatus, as in all other embodiments the same concept can be applied not only for an X-ray source, but also for particle sources, for example, of electrons or protons, and may also be extended to other apparatuses like XUV or UV sources. However, in each case the window 4 comprising or consisting of the carbon layer 5 made of GC is present.

In FIGS. 3 to 9, some examples of windows 4 are shown. In each case, the window 4 comprises a transmission layer 43 made of GC so that the transmission layer 43 is a carbon layer 5.

Figure 3:
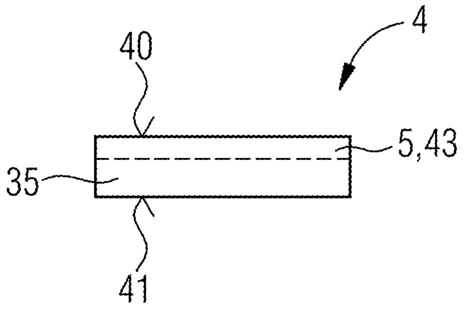
FIGS. 3 and 4 are schematic sectional views of exemplary embodiments of windows for X-ray apparatuses described herein.

According to FIG. 3, the window 4 can consist of the transmission layer 43. However, as an option, in addition there can be the target 35 as a further layer on the transmission layer 43 so that an exterior face 40 of the window 4 is of the transmission layer 43 and an interior face 41 is of the target 35. Further, it is possible that at least one adhesive layer, not shown, is located between the target 35 and the transmission layer 43. Such a layer for the target 35 and such an adhesive layer can be present in all the other examples of the window 4 as well.

Such a window 4, that is, the transmission layer 43 and the optional target 35, may directly be mounted on the opening 33 to close the housing 3.

Figure 4:
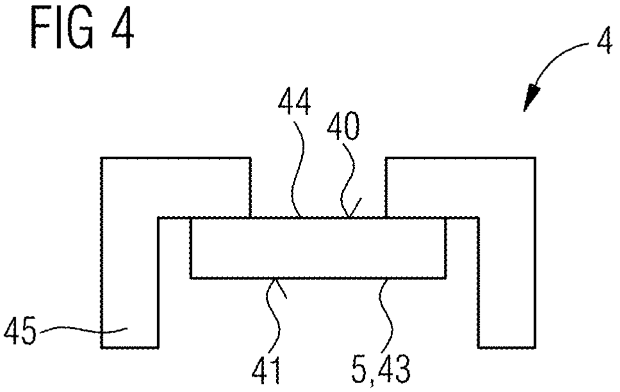
Figure 5:
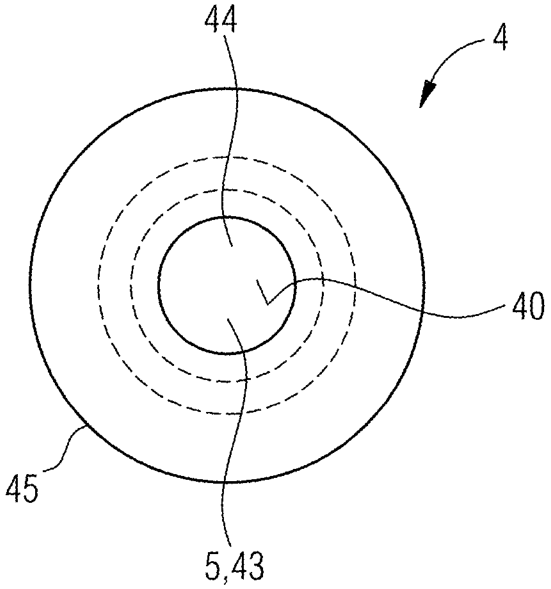
FIG. 5 is a schematic top view of the window of FIG. 4.

In FIGS. 4 and 5 it is shown that the window 4 further comprises a frame 45. The frame 45 completely surrounds a central portion 44 of the transmission layer 43. Thus, the central portion 44 is free of the frame 45. Seen in cross-section and at each lateral face of the window, the frame 45 may be of L-shape. Seen in top view, the frame 45 may be annular. The transmission layer 43 may be located on an inner side of the frame 45 so that the exterior face 40 is next to the frame 45.

For example, the central portion 44 refers to a middle-most area having at least 20% of an overall area content of the transmission layer 43, seen in top view of the exterior face 40. For example, the transmission layer 43 is circular or elliptic or square of polygonal, seen in top view.

Such a window 4 may be mounted to the housing 3 by means of the frame 45 so that the transmission layer 43 may be distant from the housing 3 due to the frame 45 and possibly due to the target 35.

Figure 6:
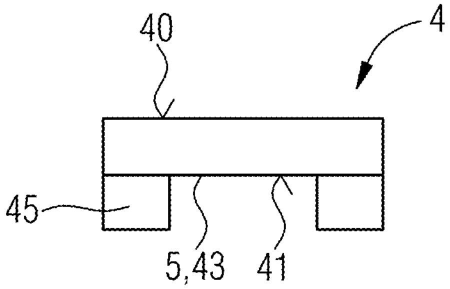
FIG. 6 is a schematic sectional view of an exemplary embodiment of a window for X-ray apparatuses described herein.
Figure 7:
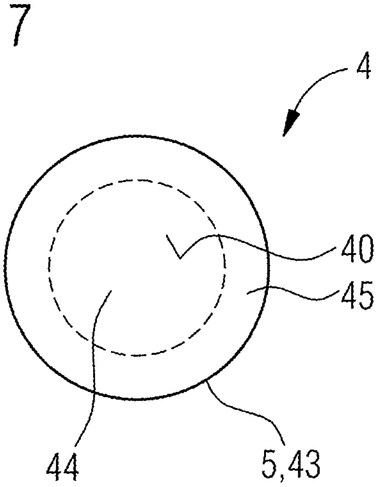
FIG. 7 is a schematic top view of the window of FIG. 6.

In the embodiment of FIGS. 6 and 7, the frame 45 is located on the interior face 41. It is possible that the transmission layer 43 and the frame 45 terminate flush with each other in a longitudinal direction. Hence, the frame 45 and the transmission layer 43 may have the same shape and/or may have congruent outer edges, seen in top view.

Figure 8:
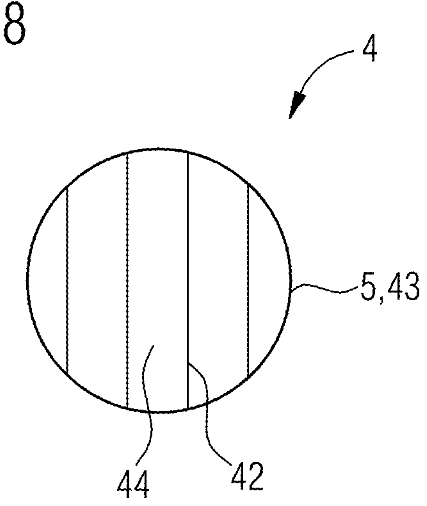
FIGS. 8 and 9 are schematic top views of exemplary embodiments of windows for X-ray apparatuses described herein.
Figure 9:
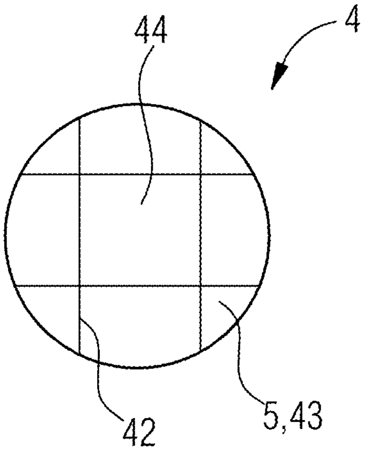

The windows 4 shown in FIGS. 8 and 9 additionally comprise a supporting structure 42. The supporting structure 42 is located on at least one of the interior face 41 or the exterior face 40. The supporting structure 42 can also be of GC, or the supporting structure 42 is of a different material compared with the transmission layer 43. The supporting structure 42 and the transmission layer 43 can be in direct contact with each other or there is an adhesion layer in-between. Such at least one adhesion layer, not shown in the drawings, may alternatively or additionally also be used to assemble the frame 45 and/or the target 35, if present.

According to FIG. 8, the supporting structure 42 is made of one or of a plurality of bars that may run in parallel with each other. Contrary to that, in FIG. 9 it is shown that the supporting structure 42 forms a grid, seen in top view. Said grid may be a regular pattern, for example, a square, rectangular or hexagonal pattern.

Such a supporting structure 42 can be present in all the other examples of the window 4 as well. Further, as stated above, all the windows 4 may comprise the target 35 and alternatively or additionally the at least one adhesive layer. These windows 4 having the carbon layer 5 can be used for all the examples of the X-ray apparatus. Furthermore, as stated above, the optional supporting structure 42 can be attached by using an adhesive layer as well.

Figure 10:
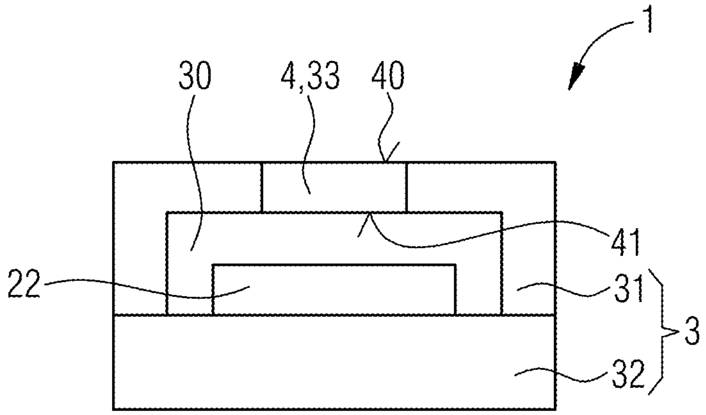
FIGS. 10 and 11 are schematic sectional views of exemplary embodiments of X-ray apparatuses described herein.

The X-ray apparatus 1 of FIG. 10 comprises an X-ray detector 22 and is therefore for detecting X-rays. Alternatively, the apparatus may serve as a detector for gamma rays or particles like electrons or protons.

The X-ray detector 22 is, for example, a silicon drift detector. The window 4 is located in the opening 33 in the housing 3. As also possible for the apparatuses of FIGS. 1 and 2, the window 4 may terminate flush with the housing 3 at least one of the exterior side 40 or the interior side 41.

Otherwise, the same as to FIGS. 1 to 9 may also apply to FIG. 10, and vice versa.

Figure 11:
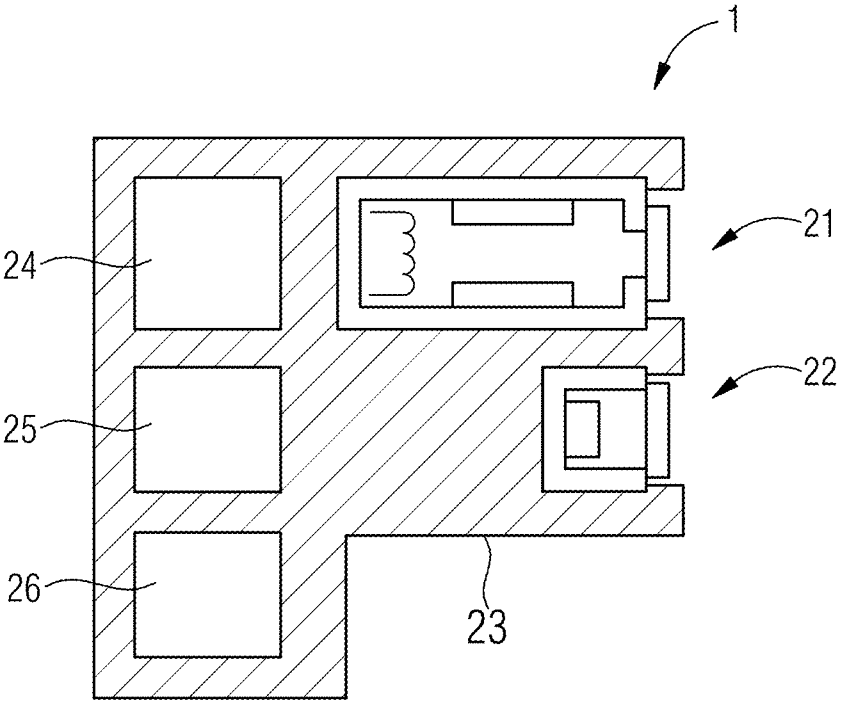

In FIG. 11 an X-ray apparatus 1 is shown that comprises both the X-ray source 21 and the X-ray detector 22, for example, configured as explained in connection with FIGS. 1, 2 and/or 10. As an option, the X-ray apparatus 1 may further comprise at least one of a display 24, a control unit 25 and an energy source 26, like a battery. By way of example, the X-ray apparatus 1 may be a hand-held apparatus used for material analysis.

Figure 12:
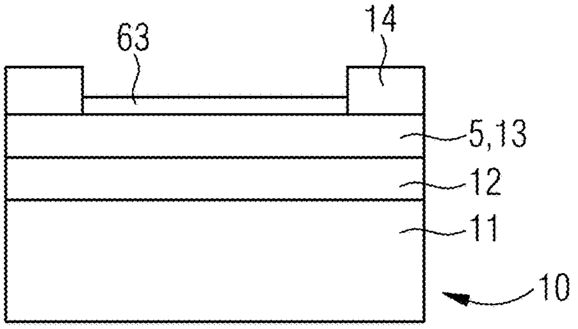
FIGS. 12 to 14 are schematic sectional views of exemplary embodiments of electron emission devices described herein.
Figure 13:
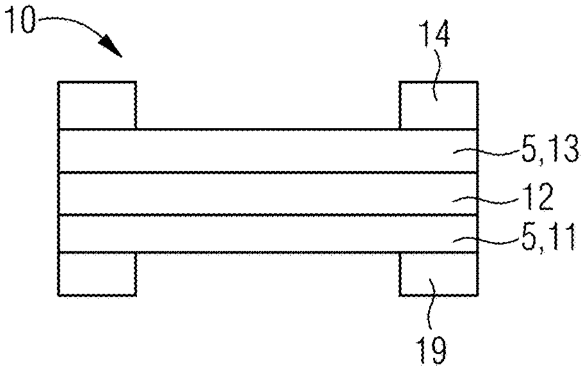
Figure 14:
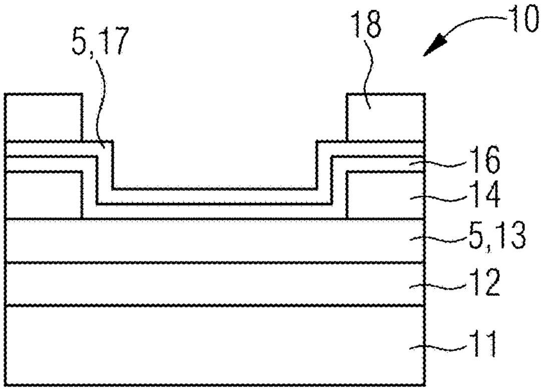

In FIGS. 12 to 14, another application for the carbon layer 5 is illustrated. The carbon layer 5 is used, at least, as a gate layer 13 in an electron emission device 10 which is configured as a GIS structure. The GIS structure further comprises an electrically conductive base layer 11, like a carrier, an electrically insulating intermediate layer 12 directly thereon and the carbon layer 5, that is, the gate layer 13, directly on the intermediate layer 12.

In a GIS structure, field emission allows electrons to tunnel into the conduction band of the intermediate layer 12 when a voltage is applied between the base layer 11 and the gate layer 13. If there is a sufficient voltage drop and low scattering probability, these hot electrons can be emitted through the gate layer 13 into a space above the gate layer 13. An energy that can be achieved by the electrons is limited by the dielectric strength and/or by the lifetime of the intermediate layer 12. As the voltage increases, for a given thickness of the intermediate layer 12, the tunneling current increases and consequently the stress increases and thus the lifetime decreases. To a certain extent, the thickness of the intermediate layer 22 can be increased to reduce the tunnel current at a given voltage, but in doing so, stray effects increase, decreasing efficiency. Similarly, the maximum charge transported by the tunneling process before a breakdown can decrease with increasing thickness.

An energy range for the emitted electrons of, for example, up to 50 eV is possible. In this type of electron emitter, the actual tunnel barrier is the interface between the intermediate layer 12 and the base layer 11, which is thus not exposed to the influence of an environment of the device 10. This principle thus works not only in vacuum but also at atmospheric pressure around the device 10 as well as in liquids, making an evacuated package superfluous. Since the electron energy can be adjusted in a certain range, via the voltage as well as for a constant electric field via the thickness of the intermediate layer 12, an electron source with variable electron energy can thus be realized. However, this electron source can also be used inside of the described x-ray source as an electron emitting element.

In order to achieve the lowest possible scattering in the gate layer 13 and at the interface to the intermediate layer 12, the gate layer 13 should be made as thin as possible on the one hand. On the other hand, the gate layer 13 should have a small energy difference of the conduction band edge to the conduction band edge of the intermediate layer 12 in order to minimize quantum mechanical reflection and should be sufficiently electrically conductive. The gate layer 13 realized by the carbon layer 5 of GC allows such a layer to be efficiently produced.

For example, the intermediate layer 12 is made of silicon dioxide, since the achievable high oxide quality as well as the relatively precisely adjustable thickness allow a high current density and thus service life. Especially in combination with a silicon carrier as the base layer 11, established manufacturing processes are also available. In addition, the intermediate layer 12 can be of hexagonal boron nitride, or hBN for short. Since the thickness can also be very well controlled by various fabrication methods, hBN is an interesting option for the intermediate layer 12. The high-k dielectrics used in CMOS technology can also be considered for the intermediate layer 12. Especially fabrication methods like atomic layer deposition, ALD, are able to achieve very homogeneous layers with a relatively high quality.

Silicon dioxide for the intermediate layer 12 can be generated, for example, thermally, in particular wet, dry, at room temperature or in an oxidation furnace, or by chemical vapor deposition, CVD, or by vapor deposition. hBN or BN can be generated, for example, by plasma-enhanced CVD and annealing, pulsed CVD, Pulsed Laser deposition, Low Pressure CVD, cathalytic growth and transfer. High-k dielectrics such as $Al_2O_3$ or HfO can be produced by evaporation, sputtering, ALD, CVD, pulsed CVD, plasma-enhanced CVD or Pulsed Laser deposition. For example, the intermediate layer 12 has a dielectric strength of 0.1 V/nm to 500 V/nm.

With silicon as the material for the base layer 11, also referred to as carrier electrode or substrate electrode, common methods from the CMOS industry are available and scalable, reproducible manufacturing is achievable. By varying the doping, the electrical properties can be influenced and even a voltage drop at the gate electrode can be compensated for by a suitable doping profile. Silicon also offers the possibility of integrating further functionality on a chip.

Furthermore, for the base layer 11 Highly Oriented Pyrolitic Graphite, or HOPG for short, is possible as a highly conductive, flexible material. Sapphire, hBN, silicon carbide or even a metal or metal film are also possible for the base layer 11. As an option, the electrically conductive base layer 11 can be applied on a non-conductive carrier layer for mechanical stability, not shown.

The base layer 11 can thus be silicon, with a possible doping of either p or n and a doping level of — to ++, with P, As, Sb, B, Al, Ga and/or In as possible dopants. Furthermore, HOPG and graphite foils as well as sapphire wafers, possibly with a carbon layer, and SiC, possibly with a carbon layer, too, can also be used, as well as metal films.

For example, a thickness of the base layer 11 is at least one monolayer and/or at most 5 mm. The base layer 11 may be mechanically rigid or flexible. For example, a specific electrical conductivity of the base layer 11 is between $10^{-1}$ S/m and $10^9$ S/m, inclusive.

It is possible that a first electric contact structure 14 is applied directly on the carbon layer 5, see FIG. 12, or also between the carbon layer 5 and the intermediate layer 12. For example, the first electric contact structure 14 can be a metallic structure. However, the first electric contact structure 14 also be made of GC, however, with a thickness of, for example, at least 0.1 μm and, thus, by far thicker than the gate layer 13.

As a further option, on top of the gate layer 13 and optionally on top of the first electric contact structure 14, there can be a protection layer 63, the protection layer 63 protects the device 10 from environmental influences. However, GC has a high robustness against environmental influences so that such a protection layer 63 may be omitted, especially if the first electric contact structure 14 is made of GC as well. In other words, the carbon layer 5 and, thus, the GC itself may act as a protection layer. However, in oxygen an additional material may be needed or may be practical. An additional protection layer, not shown, may also be present on a side of the base layer 11 facing away from the gate layer 13, for example.

It is possible that the carbon layer 5 is provided with a bar structure or a grid structure and/or with a frame to improve current distribution across the gate layer 13. Hence, the gate layer 13 can be provided with an electrically conductive structure, possibly made of GC, and configured as disclosed in connection with FIG. 8 or 9, for example.

Otherwise, the same as to FIGS. 1 to 11 may also apply to FIG. 12, and vice versa.

In FIG. 13 it is illustrated that the base layer 11 is a carbon layer 5, too, and is thus also can be made of GC or another carbon based material. Hence, the device 10 can be mechanically flexible. If the base layer 11 is comparably thin, for example, having a thickness of at most 1 mm or of at most 0.1 mm, as an option there can be a second electric contact structure 19. The second electric contact structure 19 can be a metallic structure or can also be made of GC. Other than shown, the second electric contact structure 19 may also be a continuous layer of constant thickness.

Otherwise, the same as to FIG. 12 may also apply to FIG. 13, and vice versa.

The electron emission device of FIG. 14 further comprises an insulation layer 16 and a control electrode 17. For the insulation layer 16, the same applies as for the intermediate layer 12. For the control electrode 17, the same as for the gate layer 13 may apply.

In this case, the potential set on the control electrode adjusts the energy of the emitted electrons, in particular, according to the following equation:

$$\overline{E}_e = V_{SESE} * e - \overline{E}_{verl.2} - W_A;$$

where "$\overline{E}_e$" is the average energy of the emitted electrons, "$V_{SESE}$" the applied potential difference between the carrier and the energy control electrode 17 of the GIS, "e" the elementary charge, "$\overline{E}_{verl.2}$" the average energy loss due to scattering in the GIS structure 12, 13, 16, 17, and "$W_A$" the work function of the control electrode 17. That is, the additional stack 16, 17 increases the average energy loss, but the total energy can then be adjusted independently of the emission current by the additional potential provided by means of the control electrode 17.

To electrically contact the control electrode 17, as an option there is the third electric contact structure 18 which may be placed on top of the control electrode 17 and on top of the first electric contact structure 14. The third electric contact structure 18 can be made of GC as is possible for the first electric contact structure 14. Both the gate layer 13 and the control electrode 17 may be carbon layers made of GC.

Otherwise, the same as to FIGS. 12 and 13 may also apply to FIG. 14, and vice versa.

Figure 15:
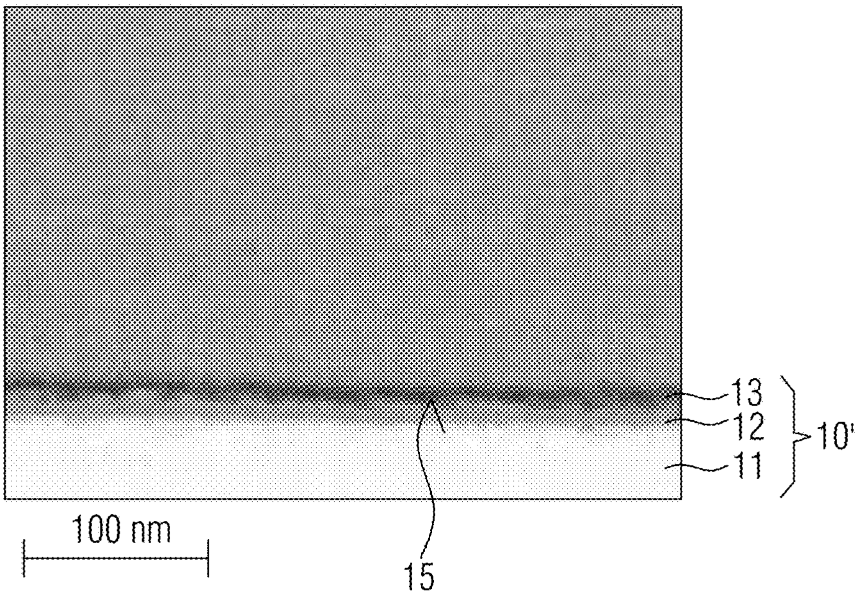
FIG. 15 is a sectional view of an interface between a gate layer and in insulation layer of a modified electron emission device.

In FIG. 15, a modified electron emission device 10' is illustrated. Instead of the gate layer made of GC, there is a gate layer 13 made of graphene which exhibits better electric conductivity and which may be made thinner. However, due to the increased temperature required to apply graphene, a roughening 15 can occur at an interface between the intermediate layer 12, for example, made of silicon dioxide, and the gate layer 13. This roughening 15 can lead to an increased electron scattering at the interface and/or a non-uniform current distribution, hence a lower areal efficiency. By having the carbon layer 5 of GC, a smoother interface can be achieved.

Figure 16:
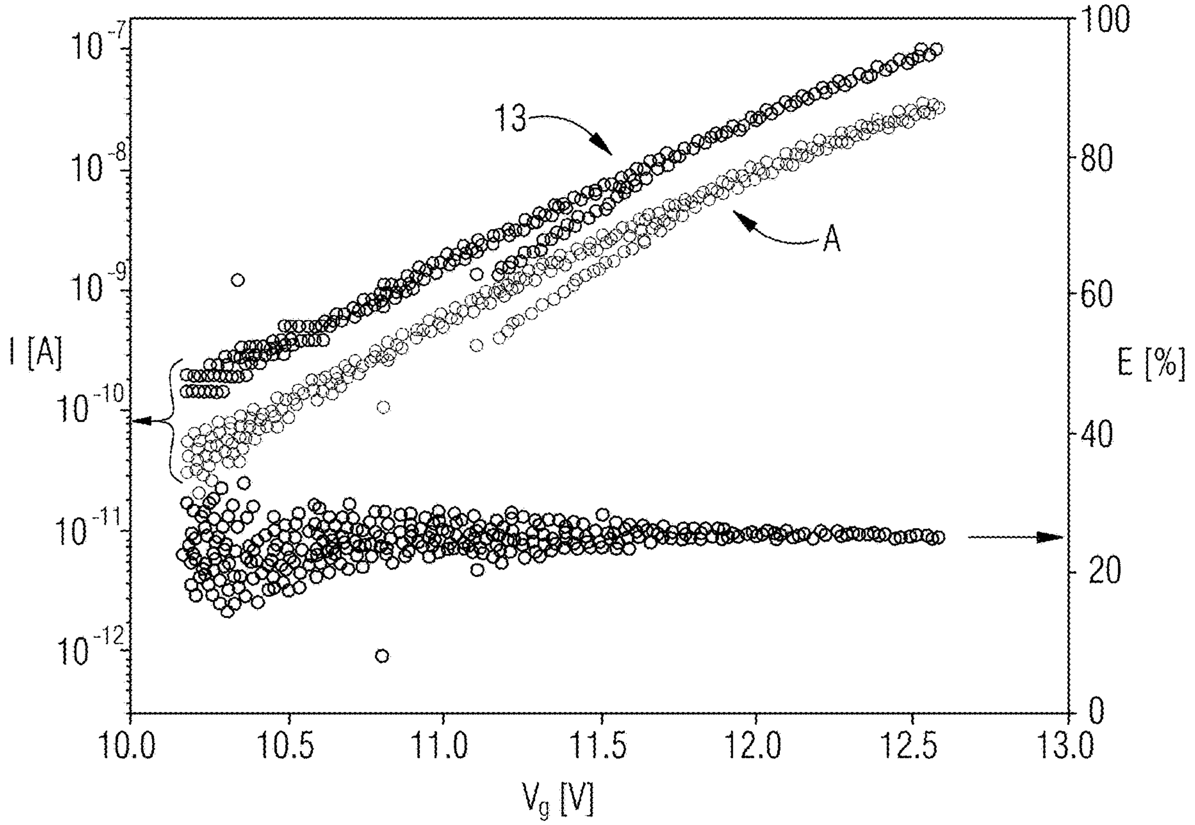
FIG. 16 is a representation of electrical data of an exemplary embodiment of an electron emission device described herein.

Concerning FIG. 16, a GIS structure 10 with an oxide thickness of 13 nm of the intermediate layer 12 was produced, in which the gate layer 13 as the electrode was made of glassy carbon. For this purpose, the photoresist AZ-nLof 2070 from MicroChemicals was diluted to 5 wt. % with the diluent AZ EBR and was spin-coated at a rotation speed of 6000 rpm to achieve a target thickness of 5 nm to 20 nm. After subsequent exposure and development, the layer was annealed in an oven at 900° C. and at 1.1 mbar with 200 sccm flowrate of argon for 1 h. FIG. 16 shows a voltage sweep of the gate voltage Vg at the gate layer 13 of such a component wherein a current strength I through the gate layer 13 and a current of an opposite anode receiving the emitted electrodes are plotted as well as a resulting electron emission efficiency E. Despite the relatively simple process, an electron emission efficiency E of about 25% is achieved.

Figure 17:
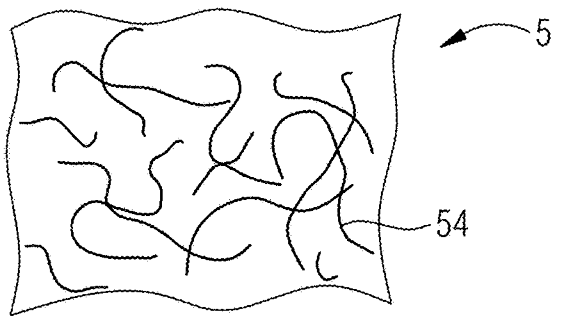
FIG. 17 is a schematic top view of an exemplary embodiment of a carbon layer for X-ray apparatuses and electron emission devices described herein.

In FIG. 17, the microstructure of the GC is schematically shown. Thus, the carbon layer 5 comprises a plurality of filaments 54. These filaments 54 are relatively long and can be slung and weaved into each other. For example, because of this structure, the carbon layer 5 can have a relatively large mechanical strength.

Figure 18:
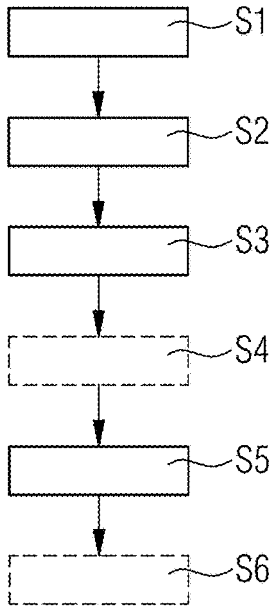
FIG. 18 is a schematic block diagram of an exemplary embodiment of a manufacturing method for X-ray apparatuses and electron emission devices described herein.

FIG. 18 shows a block diagram of a method to produce the carbon layer 5, either used as the transmission layer 43 or as the gate layer 13.

In a method step S1, a substrate 50 is provided. The substrate 50 is either the final component the carbon layer 5 is desired to be on, or the substrate 50 is a temporal auxiliary substrate.

Figure 19:
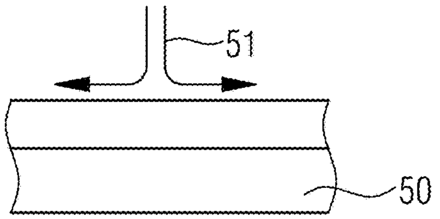
FIGS. 19 to 21 are schematic sectional views of method steps of an exemplary embodiment of a manufacturing method for X-ray apparatuses and electron emission devices described herein.

In method step S2, an organic raw material 51 is applied onto the substrate 50, see also FIG. 19. The raw material 51 is applied as a liquid. For example, the raw material is a photo-sensitive material.

Then, in method step S3, the raw material 51 is solidified so that a raw material layer 52 is formed. The solidifying is or comprises, for example, radiation hardening using radiation like UV or thermal hardening.

Figure 20:
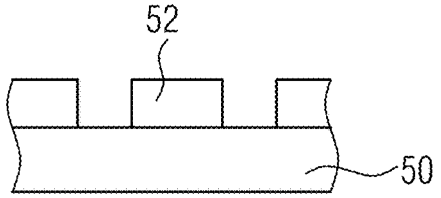

In optional method step S4, the raw material layer 52 is structured to have the shape of the final carbon layer, see also FIG. 20. This is either done directly, for example, by a photo-based technique like hardening and removing superfluous material after an irradiation step, if the raw material layer 52 is photo-sensitive, or this is done indirectly by applying a photo-sensitive material, like a photo-resist, on the raw material layer 52 and structuring the latter, for example, lithographically.

Hence, for example, after the lithographic structuring an additional hardening is carried out or the hardening is only done after structuring.

Subsequently, see method step S5, the raw material layer 52 is pyrolized so that the GC and, thus, the carbon layer 5 is created. This may be done, for example, at any temperature between 400° C. and 2000° C.

Figure 21:
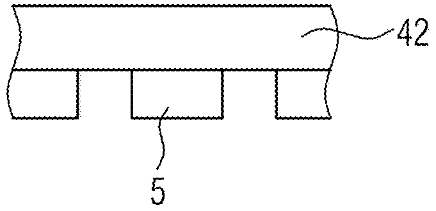

If the substrate 50 is just an auxiliary carrier and is not present in the finished component, as shown in FIG. 21, the carbon layer 5 may be transferred to a final carrier, like a frame 45, and an electrical or mechanical support structure 42, compare FIGS. 3 to 9, may be applied to the carbon layer 5. Otherwise, the carbon layer 5 may directly be formed on the intermediate layer 12, for example.

Otherwise, the same as to FIGS. 1 to 14 and 17 may also apply to FIGS. 18 to 21, and vice versa.

Thus, an example of the manufacturing method may be summarized as follows; these aspects may individually or in any combination apply to all other embodiments:

A photosensitive lacquer, like AZ-nLof 2070, can be diluted between 1% and 100% percent by weight using a thinner, like AZ EBR. The diluted lacquer is then spin-coated onto a substrate with a spin coater at a rotation frequency between 500 rpm and 10000 rpm, for example. Depending on the chosen parameters, like dilution and rotation speed, a resulting resist thickness between 1 nm and 10 μm can be produced.

The substrate with the spun-on photoresist can then be structured by lithography, like photo structuring or electron beam structuring. Subsequently, the resist is pyrolized in an oven at temperatures between 500° C. and 2000° C., for example. The resulting resist film thickness after lithography is then determined. The resulting film thickness after pyrolysis is between half and one-twentieth of the thickness before pyrolysis and, thus, between a monolayer and 10 μm, for example. This process is easily scalable and industrially suitable thanks to well-known processes such as rotational coating or lithography. As a developer, for example, AZ 2026 MIF may be used.

Figure 22:
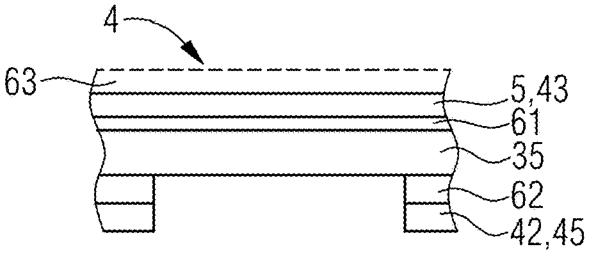
FIG. 22 is a schematic sectional view of an exemplary embodiment of a window for X-ray apparatuses described herein.

In FIG. 22, another example of the window 4 is illustrated. In this case, the protection layer 63 is present at a side of the carbon layer 5 remote from the target 35, for example. A further protection layer, not shown, may be applied on the target 35 as well. Such protection layers can also be present in all other embodiments of the X-ray apparatus 1.

As an additional option it is illustrated in FIG. 22 that there is a first adhesion layer 61 located directly between the carbon layer 5 and the target 35, for example. Alternatively or additionally, there is a second adhesion layer 62 directly between the target 35 and the frame 45 or the supporting structure 42 or otherwise directly between the carbon layer 5 and the frame 45 or the supporting structure 42. Such adhesion layers 61, 62 can also be present in all other embodiments of the X-ray apparatus 1.

Figure 23:
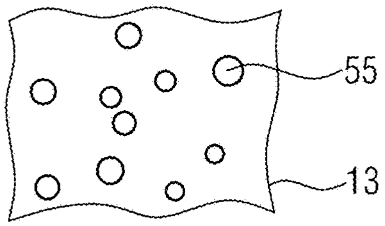
FIGS. 23 and 24 are schematic top views of exemplary embodiments of gate layers for electron emission devices described herein.
Figure 24:
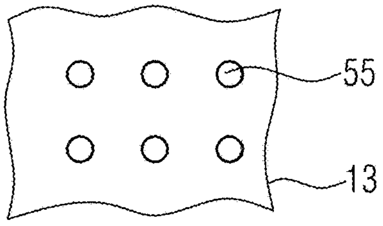

In FIGS. 23 and 24, further embodiments of the gate layer 13 are illustrated. In this embodiments, the gate layer 13 is not of continuous, hole-free fashion, as in FIGS. 12 to 14, for example, but has pores or holes 55.

In FIG. 23 it is shown that the pores or holes 55 are arranged irregularly and may also have a size distribution. Such pores or holes 55 can be produced, for example, by rapidly heating the raw material layer 52 or the liquid raw material 51 so that pores and/or holes may result. For example, a heating rate is then at least 20 K/min. A diameter of these pores or holes 55 may be relatively small and may range, for example, from at least 1 nm to at most 1 μm or to at most 0.1 μm or to at most 0.01 μm.

According to FIG. 24, the pores or holes 55 are arranged in a regular fashion, for example, in a rectangular or hexagonal grid. Such pores or holes 55 can be produced, for example, by means of nanoimprint or electron beam structuring. A diameter of these pores 55 may range, for example, from at least 0.001 μm or at least 0.01 μm to at most 1 μm or to at most 0.1 μm.

By means of such pores or holes 55, a transmittance of the gate layer 13 for electrons can be increased.

The application of the liquid raw material is also possible with other known methods such as spray coating or dip coating, for example. The specific properties of the carbon layer 5, like an electric conductivity, can be varied and adjusted depending on the pyrolysis temperature, the precursor used and the duration of the pyrolysis, for example.

The components shown in the figures follow, unless indicated otherwise, exemplarily in the specified sequence directly one on top of the other. Components which are not in contact in the figures are exemplarily spaced apart from one another. If lines are drawn parallel to one another, the corresponding surfaces may be oriented in parallel with one another. Likewise, unless indicated otherwise, the positions of the drawn components relative to one another are correctly reproduced in the figures.

The invention described here is not restricted by the description on the basis of the exemplary embodiments. Rather, the invention encompasses any new feature and also any combination of features, which includes in particular any combination of features in the patent claims, even if this feature or this combination itself is not explicitly specified in the patent claims or exemplary embodiments.

What is claimed is:

1. An electron emission device comprising:

an electrically conductive base layer;

an intermediate layer directly on the base layer, wherein the intermediate layer is of a material having a band gap leading to a higher energy of a conduction band edge of the intermediate layer compared to the base layer; and an electrically conductive gate layer directly on a side of the intermediate layer remote from the base layer, wherein a breakdown voltage of the intermediate layer exceeds a work function of the gate layer divided by an elementary charge, wherein the gate layer is a carbon layer of glassy carbon, and wherein the electron emission device is configured to emit electrons through the gate layer upon applying a voltage between the base layer and the gate layer.

2. The electron emission device according to claim 1, wherein a thickness of the carbon layer is at least one monolayer and is at most 20 nm, and wherein the band gap of the intermediate layer is at least 4 eV.

3. The electron emission device according to claim 1, wherein the glassy carbon is an amorphous material.

4. The electron emission device according to claim 3, wherein, seen in top view and by transmission electron microscopy, the carbon layer comprises filaments with a length-to-width ratio of at least 10.

5. The electron emission device according to claim 1, wherein the base layer is also of glassy carbon.

6. The electron emission device according to claim 5, wherein the intermediate layer is of hexagonal boron nitride.

7. The electron emission device according to claim 1, further comprising a first electric contact structure, wherein the first electric contact structure comprises at least one of a grid structure or a bar structure extending across the gate layer and directly located at the gate layer, wherein a thickness of the first electric contact structure exceeds a thickness of the carbon layer by at least a factor of $10^2$, and wherein the first electric contact structure is also of glassy carbon.

8. The electron emission device according to claim 1, wherein the gate layer has a specific electric conductivity of at least $10^3$ S/m.

9. The electron emission device according to claim 1, wherein the electron emission device is configured for a bending radius of 1 cm or less.

* * * * *